(12) United States Patent
Urabe et al.

(10) Patent No.: US 10,284,043 B2
(45) Date of Patent: May 7, 2019

(54) STATOR FOR ELECTRIC MOTOR, ELECTRIC MOTOR, AND AIR CONDITIONER

(71) Applicant: Mitsubishi Electric Corporation, Tokyo (JP)

(72) Inventors: Yuto Urabe, Tokyo (JP); Hiroki Aso, Tokyo (JP); Kazunori Sakanobe, Tokyo (JP); Mineo Yamamoto, Tokyo (JP); Hiroyuki Ishii, Tokyo (JP); Junichiro Oya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/308,861

(22) PCT Filed: Jul. 11, 2014

(86) PCT No.: PCT/JP2014/068627
§ 371 (c)(1),
(2) Date: Nov. 4, 2016

(87) PCT Pub. No.: WO2016/006112
PCT Pub. Date: Jan. 14, 2016

(65) Prior Publication Data
US 2017/0077776 A1  Mar. 16, 2017

(51) Int. Cl.
*H02K 3/38* (2006.01)
*H02K 5/22* (2006.01)

(52) U.S. Cl.
CPC ................ *H02K 3/38* (2013.01); *H02K 5/22* (2013.01); *H02K 2203/09* (2013.01)

(58) Field of Classification Search
CPC .......... H02K 5/22; H02K 11/21; H02K 15/02; H02K 15/08; H02K 5/02; H02K 29/08; H02K 3/522; H02K 5/225; F25D 17/06
(Continued)

(56) References Cited

U.S. PATENT DOCUMENTS 9,568,012 B2 *  2/2017  Aso ........................ F04D 13/064
9,698,655 B2 *  7/2017  Urabe .................. H02K 11/042
(Continued)

FOREIGN PATENT DOCUMENTS

CN  203632370 U  6/2014
JP  05-015096 A  1/1993
(Continued)

OTHER PUBLICATIONS

Office Action dated Jun. 20, 2017 issued in corresponding JP patent application No. 2016-532396 (and English translation).
(Continued)

*Primary Examiner* — Naishadh N Desai
(74) *Attorney, Agent, or Firm* — Posz Law Group, PLC

(57) ABSTRACT

A stator for an electric motor includes a substrate, sensor leads and power leads connected to the substrate, and a lead wiring part that retains the substrate and routes the sensor leads and the power leads. The substrate has a Hall IC that is a position detection circuit for a rotor mounted thereon, and a hole for inserting a terminal provided in a board-in connector formed therein. The substrate is retained only by the lead wiring part, and the sensor leads and the power leads are retained by the lead wiring part.

9 Claims, 15 Drawing Sheets

(58) Field of Classification Search
USPC .......................................................... 310/71
See application file for complete search history.

(56) References Cited

U.S. PATENT DOCUMENTS

| | | | | |
|---|---|---|---|---|
| 9,705,375 | B2* | 7/2017 | Yamamoto | H02K 29/08 |
| 2001/0006312 | A1* | 7/2001 | Sheeran | H02K 3/50 |
| | | | | 310/71 |
| 2015/0121948 | A1* | 5/2015 | Urabe | F04D 13/064 |
| | | | | 62/498 |
| 2015/0159656 | A1* | 6/2015 | Urabe | F04D 13/064 |
| | | | | 165/104.31 |
| 2015/0263581 | A1* | 9/2015 | Yamamoto | H02K 29/08 |
| | | | | 310/43 |
| 2016/0036279 | A1* | 2/2016 | Aso | H02K 3/522 |
| | | | | 310/43 |

FOREIGN PATENT DOCUMENTS

| | | | | |
|---|---|---|---|---|
| JP | 2003-158846 | A | 5/2003 | |
| JP | 2005-197267 | A | 7/2005 | |
| JP | 2010-273525 | A | 12/2010 | |
| JP | 2011-012561 | A | 1/2011 | |
| JP | WO 2014061359 | A1* | 4/2014 | ............ H02K 29/08 |
| JP | 2014-087219 | A | 5/2014 | |

OTHER PUBLICATIONS

International Search Report of the International Searching Authority dated Sep. 22, 2014 for the corresponding international application No. PCT/JP2014/068627 (and English translation).

Office action dated May 8, 2018 issued in corresponding CN patent application No. 201480079390.4 (and English translation thereof).

* cited by examiner

STATOR FOR ELECTRIC MOTOR, ELECTRIC MOTOR, AND AIR CONDITIONER

CROSS REFERENCE TO RELATED APPLICATION

This application is a U.S. national stage application of International Patent Application No. PCT/JP2014/068627 filed on Jul. 11, 2014, the disclosure of which is incorporated herein by reference.

TECHNICAL FIELD

The present invention relates to a stator for an electric motor that drives a load, an electric motor, and an air conditioner.

BACKGROUND

A conventional electric motor described in Patent Literature 1 below includes a stator assembly, a substrate on which a sensor circuit for position detection is formed, a lead wiring part, a power-lead retaining part attached to a lead-out portion of the lead wiring part and retaining power leads, and a sensor-lead retaining part attached to the lead-out portion of the lead wiring part and retaining sensor leads. The power leads and the sensor leads are arranged into two levels and are led out to the outside from the front and back sides of the lead-out portion, respectively.

PATENT LITERATURE

Patent Literature 1: Japanese Patent Application Laid-open No. 2010-273525

However, in the stator of the conventional electric motor described in Patent Literature 1 above, the lead lead-out portion is disposed at a position away from the lead wiring part by a constant distance and the lead lead-out portion is integrally formed with the lead wiring part. That is, the lead lead-out portion and the lead wiring part are coupled with each other. Therefore, if water enters from a boundary surface between the lead lead-out part and a mold resin, the coupling portion coupling the lead lead-out portion and the lead wiring part becomes an entry path of water. In order to eliminate such an entry path of water, if the lead lead-out part is separated from the lead wiring part, the leads are retained only by the separated lead lead-out part. Therefore, if the leads are subjected to a load in a manufacturing process, there is a problem in that stress is applied to a soldered portion of the substrate connected to the ends of the leads and the electric motor may become inoperable.

SUMMARY

The present invention has been achieved in view of the above, and an object of the present invention is to provide a stator for an electric motor, an electric motor, and an air conditioner that can further improve the quality.

In order to solve the above problems and achieve the object, an aspect of the present invention is a stator for an electric motor including: a substrate; a lead connected to the substrate; and a lead wiring part retaining the substrate and routing the lead. The substrate is retained only by the lead wiring part, and the lead is retained by the lead wiring part.

According to the present invention, an effect is obtained where the quality can be further improved.

DETAILED DESCRIPTION

Exemplary embodiments of a stator for an electric motor, an electric motor, and an air conditioner according to the present invention will be explained below in detail with reference to the accompanying drawings. The present invention is not limited to the embodiments.

Embodiment

Figure 1:
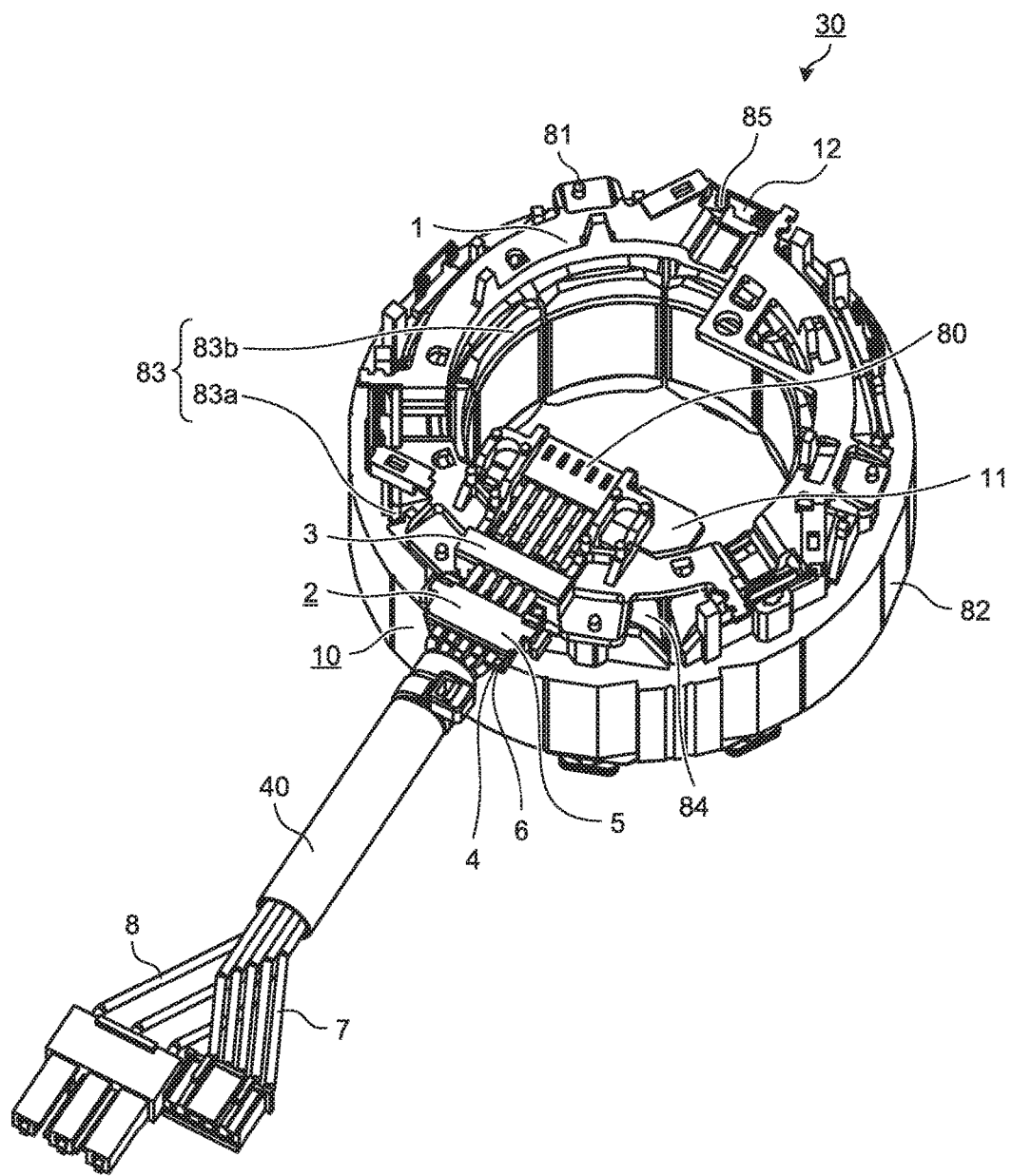
FIG. 1 is a perspective view of a stator assembly for an electric motor according to an embodiment of the present invention.
Figure 2:
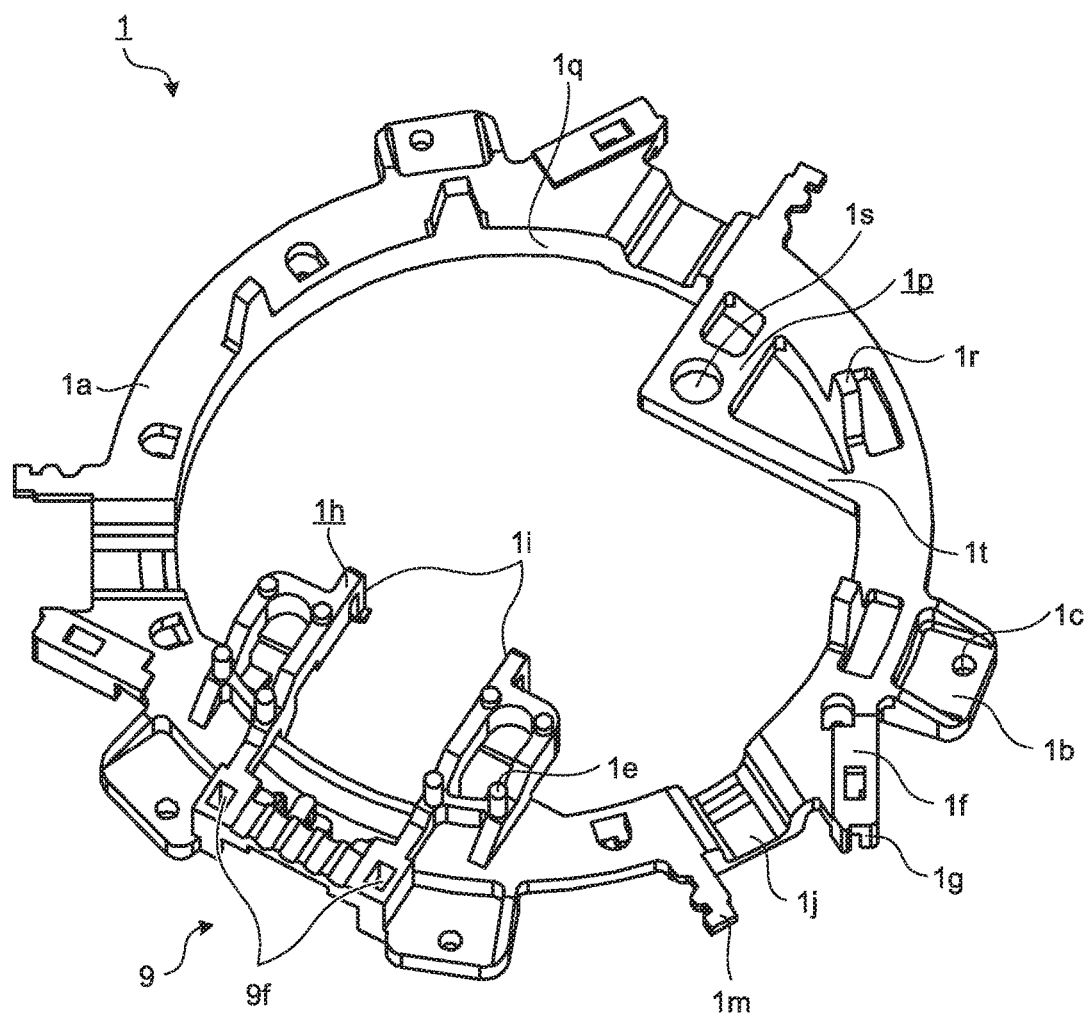
FIG. 2 is a perspective view of a lead wiring part as viewed from one end face side.
Figure 3:
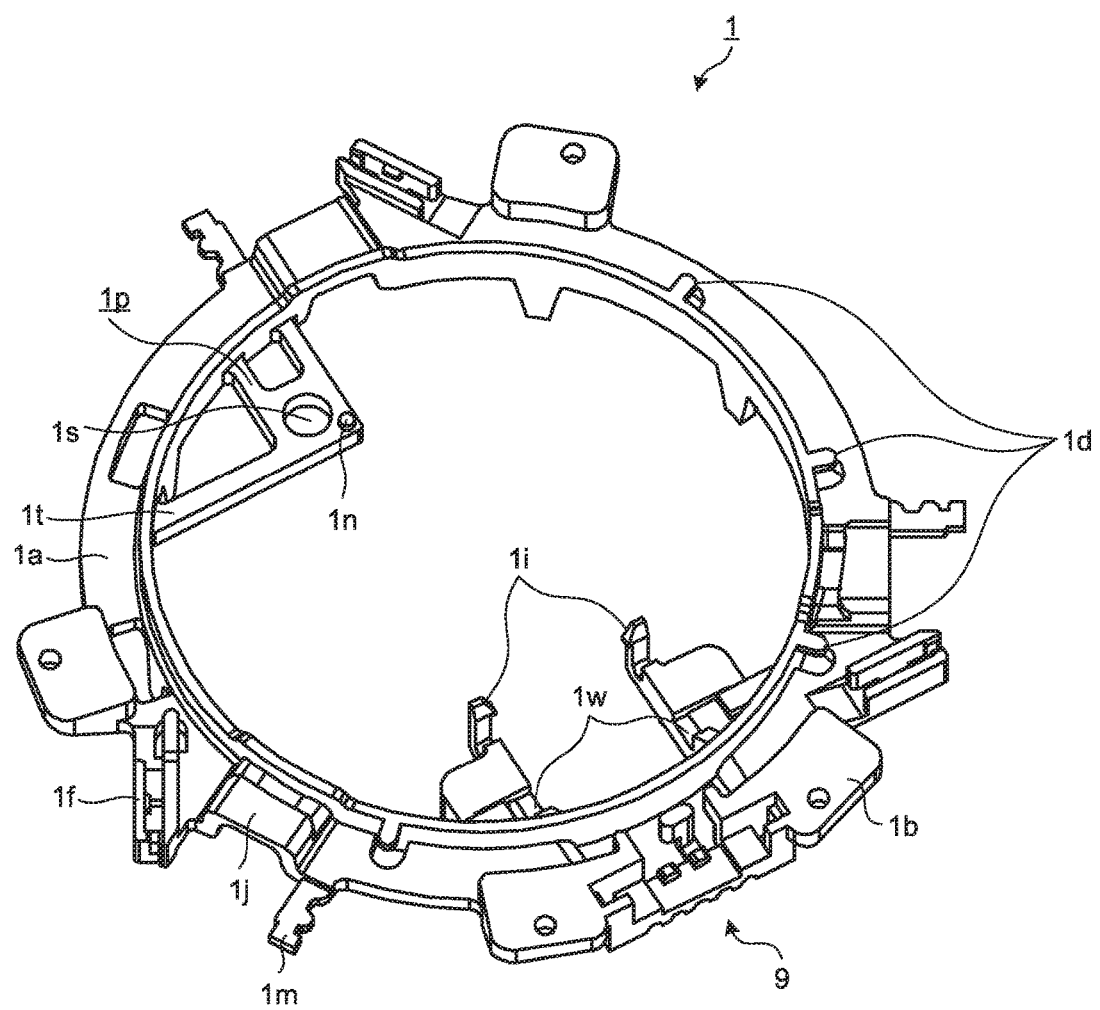
FIG. 3 is a perspective view of the lead wiring part as viewed from the other end face side.
Figure 4:
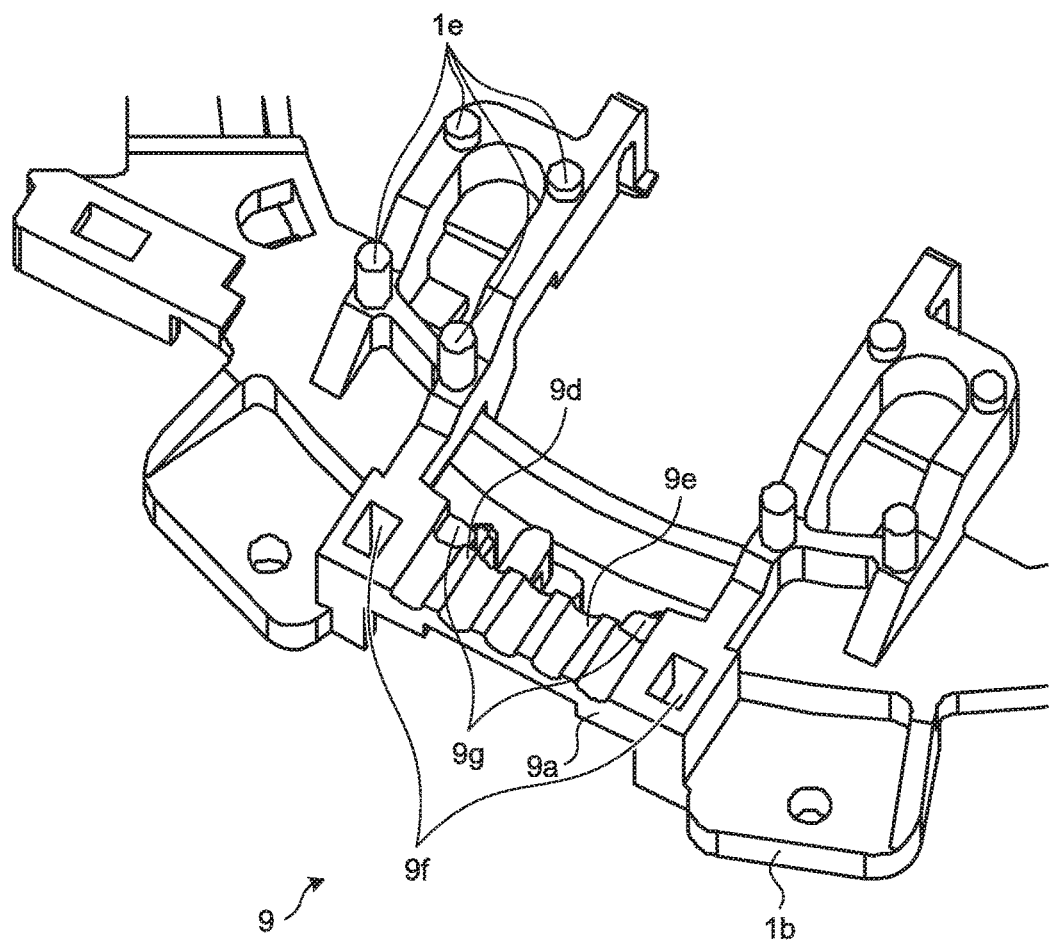
FIG. 4 is an enlarged view of a lead retaining portion as viewed from one end face side.
Figure 5:
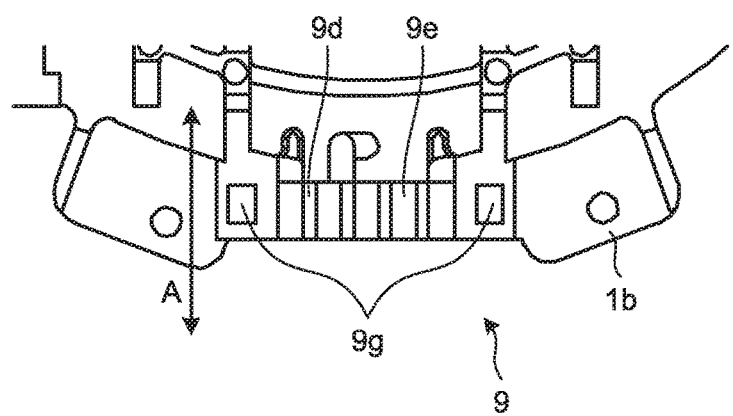
FIG. 5 is a plan view of the lead retaining portion illustrated in FIG. 4.
Figure 6:
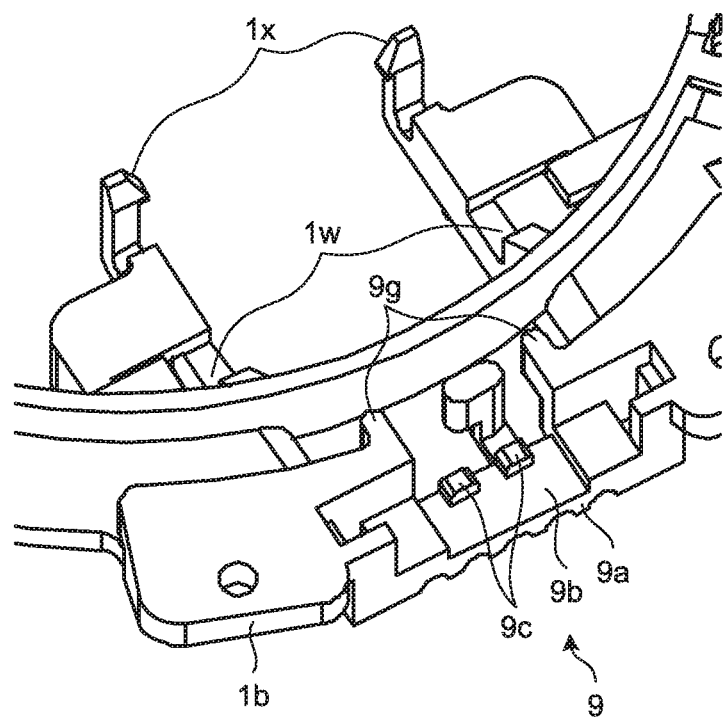
FIG. 6 is an enlarged view of the lead retaining portion as viewed from the other end face side.
Figure 7:
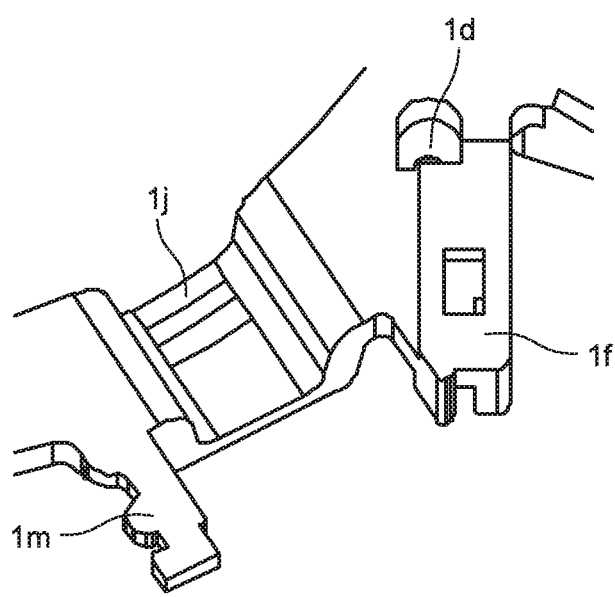
FIG. 7 is an enlarged view of a lead-end retaining portion and a core-wire retaining portion formed in the lead wiring part.
Figure 8:
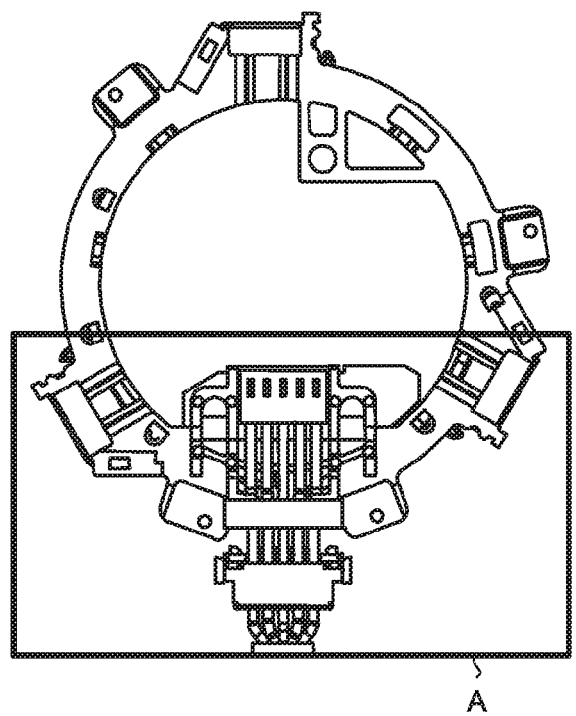
FIG. 8 is a plan view of the lead wiring part connected with a lead wiring assembly.
Figure 9:
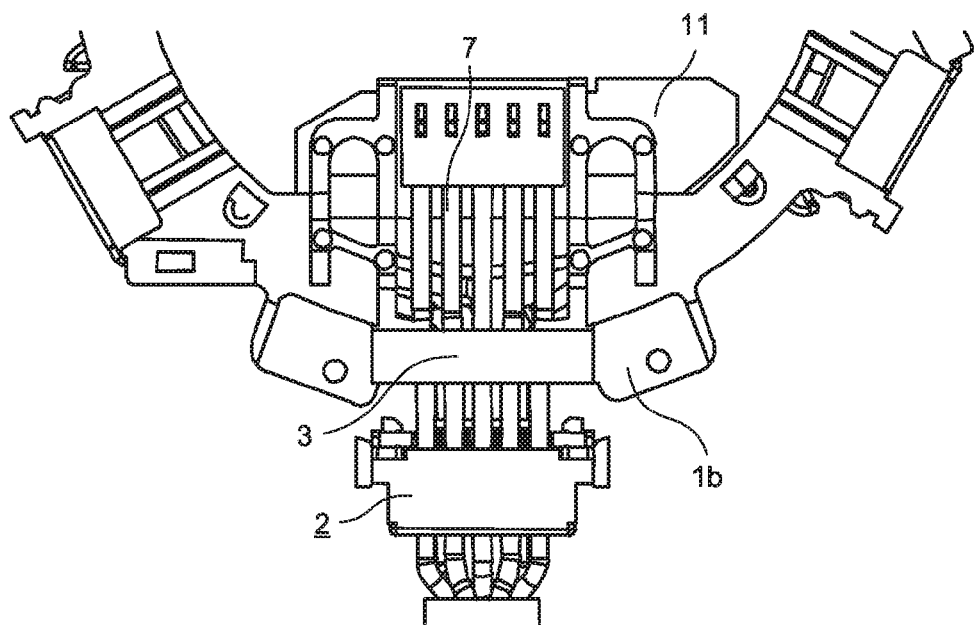
FIG. 9 is an enlarged view of relevant parts in FIG. 8.
Figure 10:
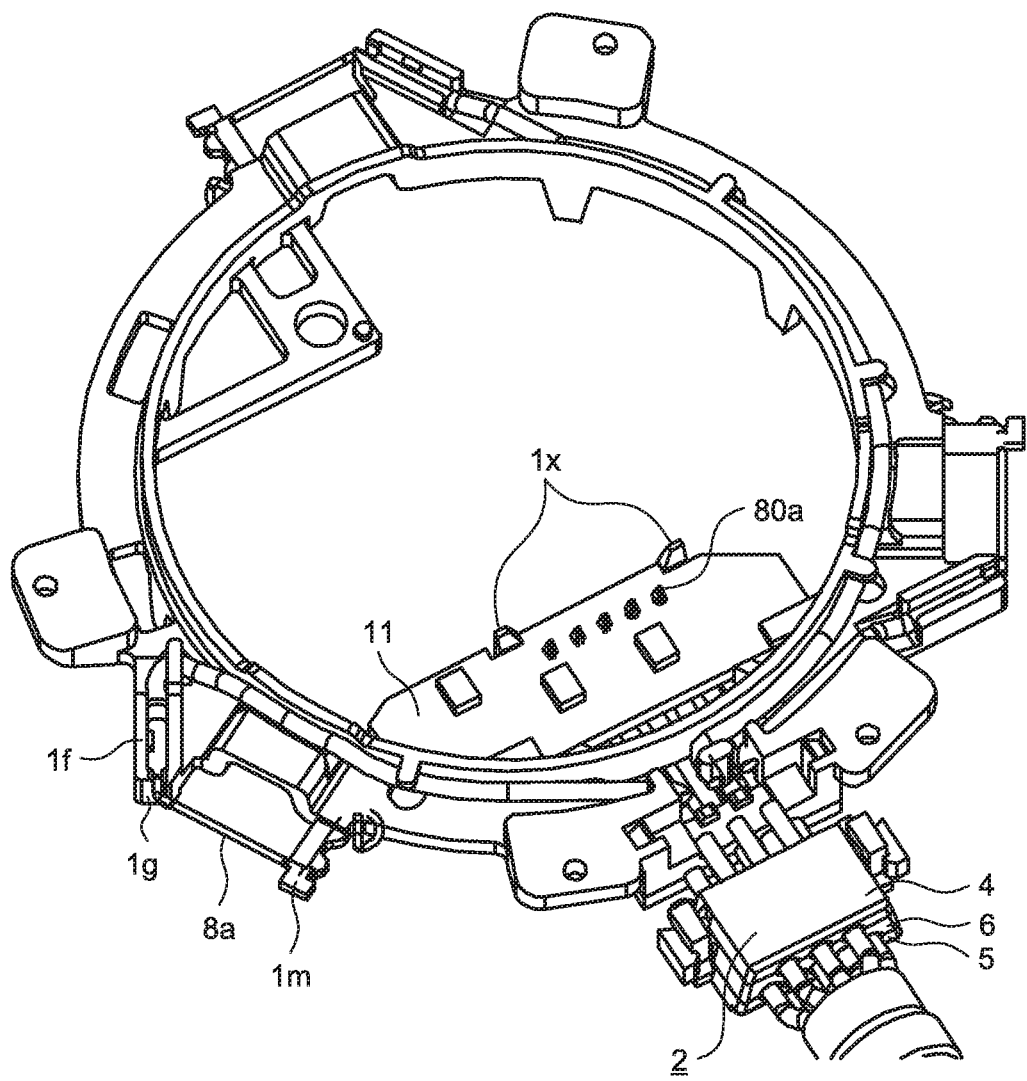
FIG. 10 is a perspective view of the lead wiring part to which a substrate is attached.
Figure 11:
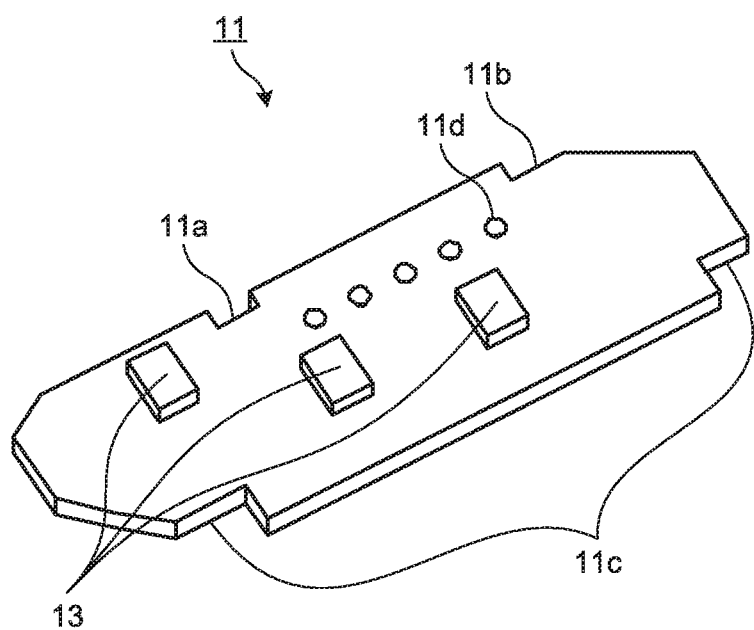
FIG. 11 is a perspective view of the substrate.
Figure 12:
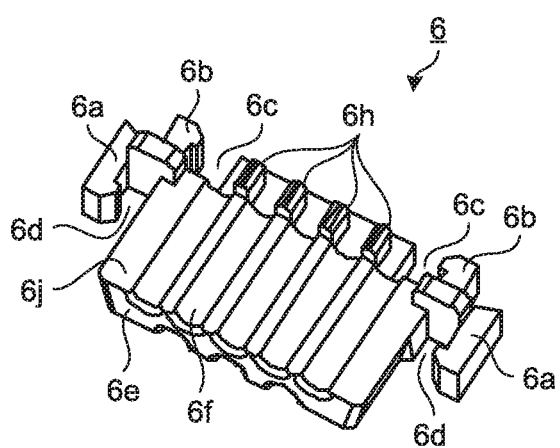
FIG. 12 is a perspective view of a lead-out part as viewed from the side of a sensor-lead facing surface.
Figure 13:
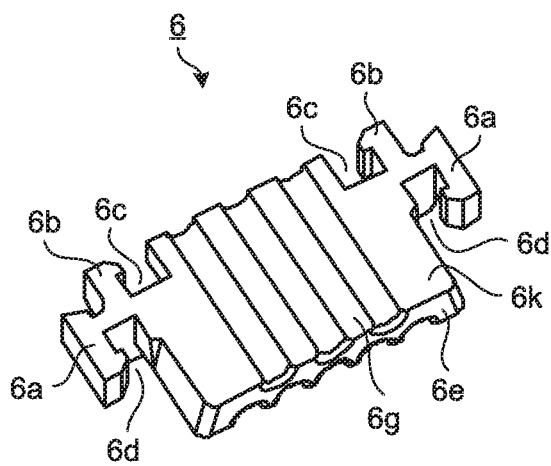
FIG. 13 is a perspective view of the lead-out part as viewed from the side of a power-lead facing surface.
Figure 14:
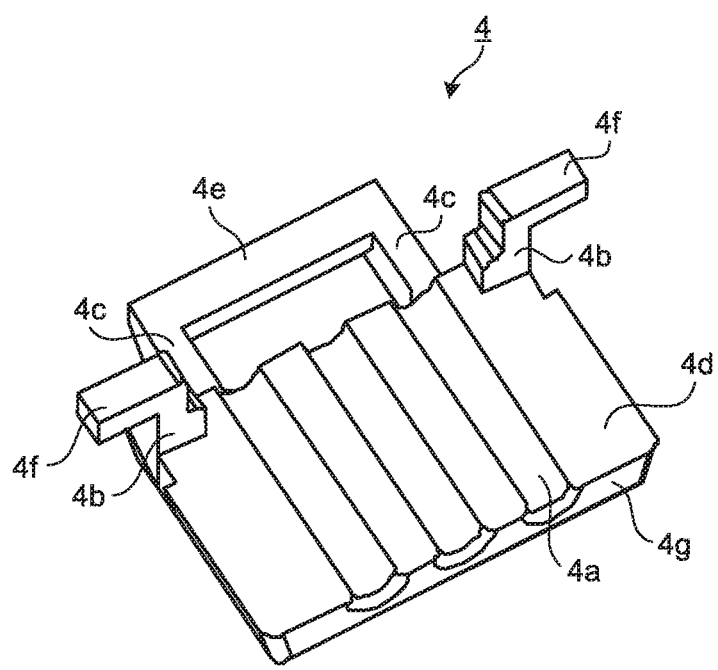
FIG. 14 is a perspective view of a power-lead retaining part.
Figure 15:
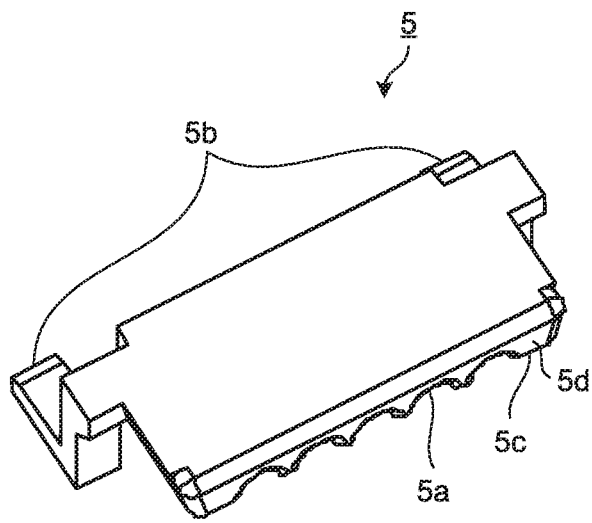
FIG. 15 is a perspective view of a sensor-lead retaining part.
Figure 16:
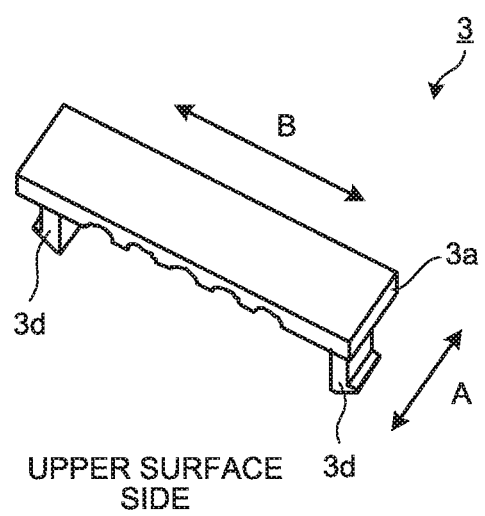
FIG. 16 is a perspective view of a lead retaining part.
Figure 17:
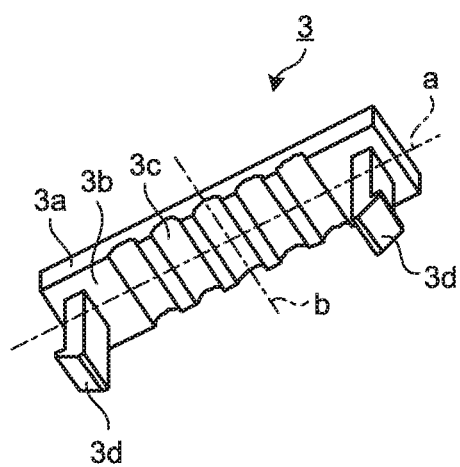
FIG. 17 is a perspective view of the lead retaining part as viewed from a sensor-lead facing surface.
Figure 18:
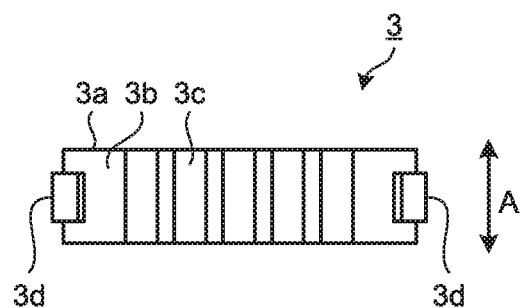
FIG. 18 is a plan view of the lead retaining part as viewed from the sensor-lead facing surface.
Figure 19:
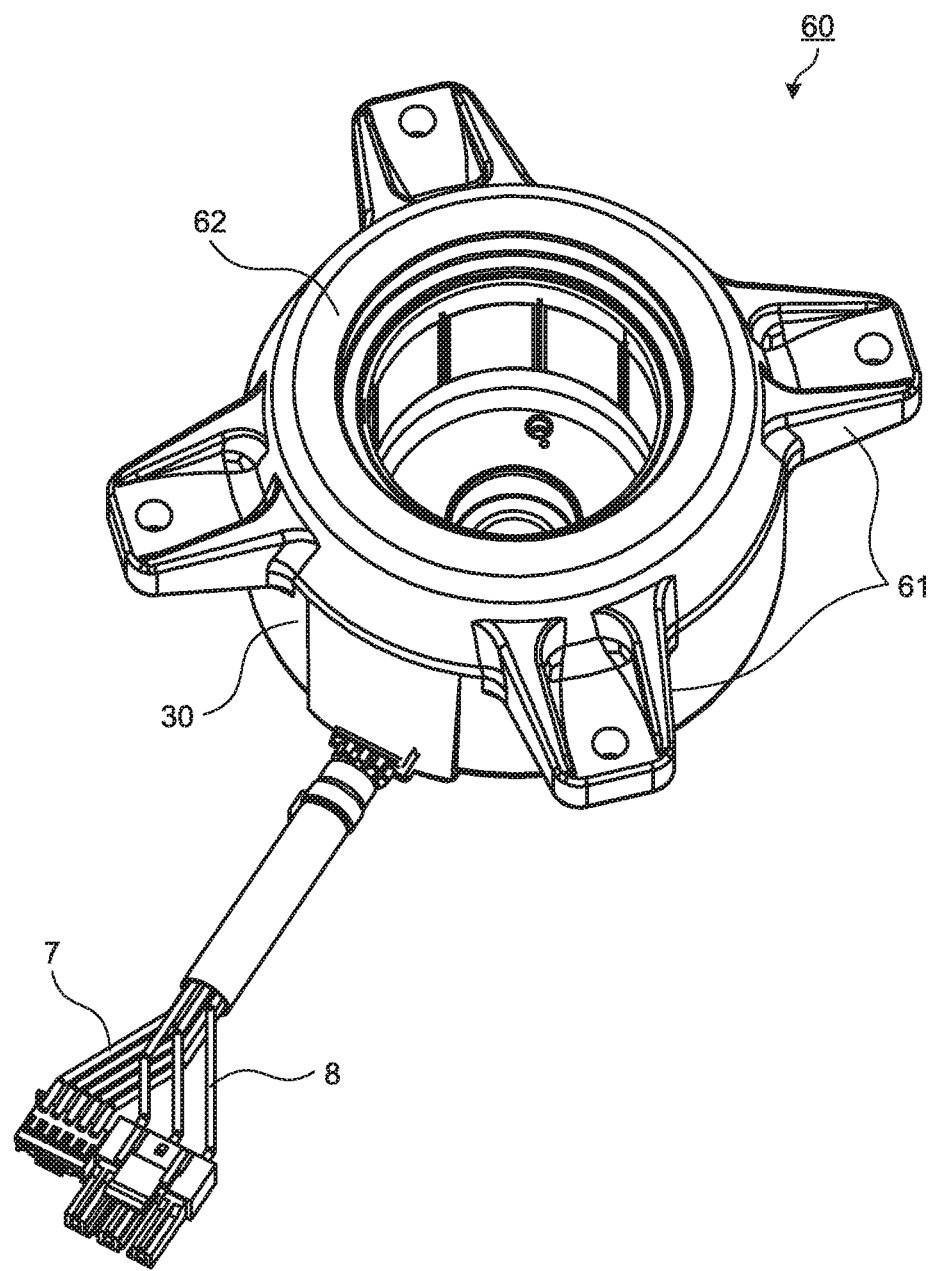
FIG. 19 is a perspective view of a molded stator.
Figure 20:
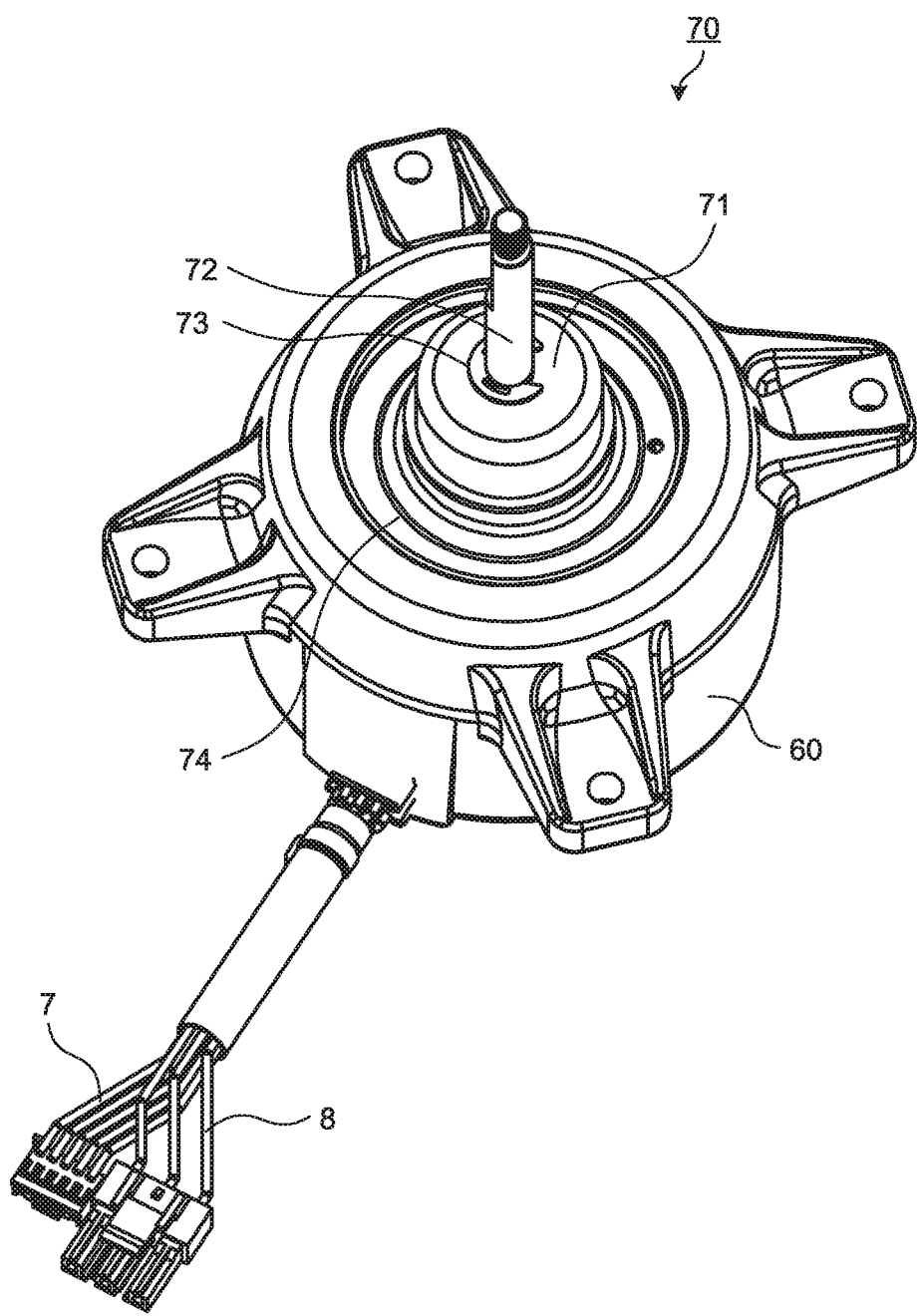
FIG. 20 is a perspective view of a molded electric motor.
Figure 21:
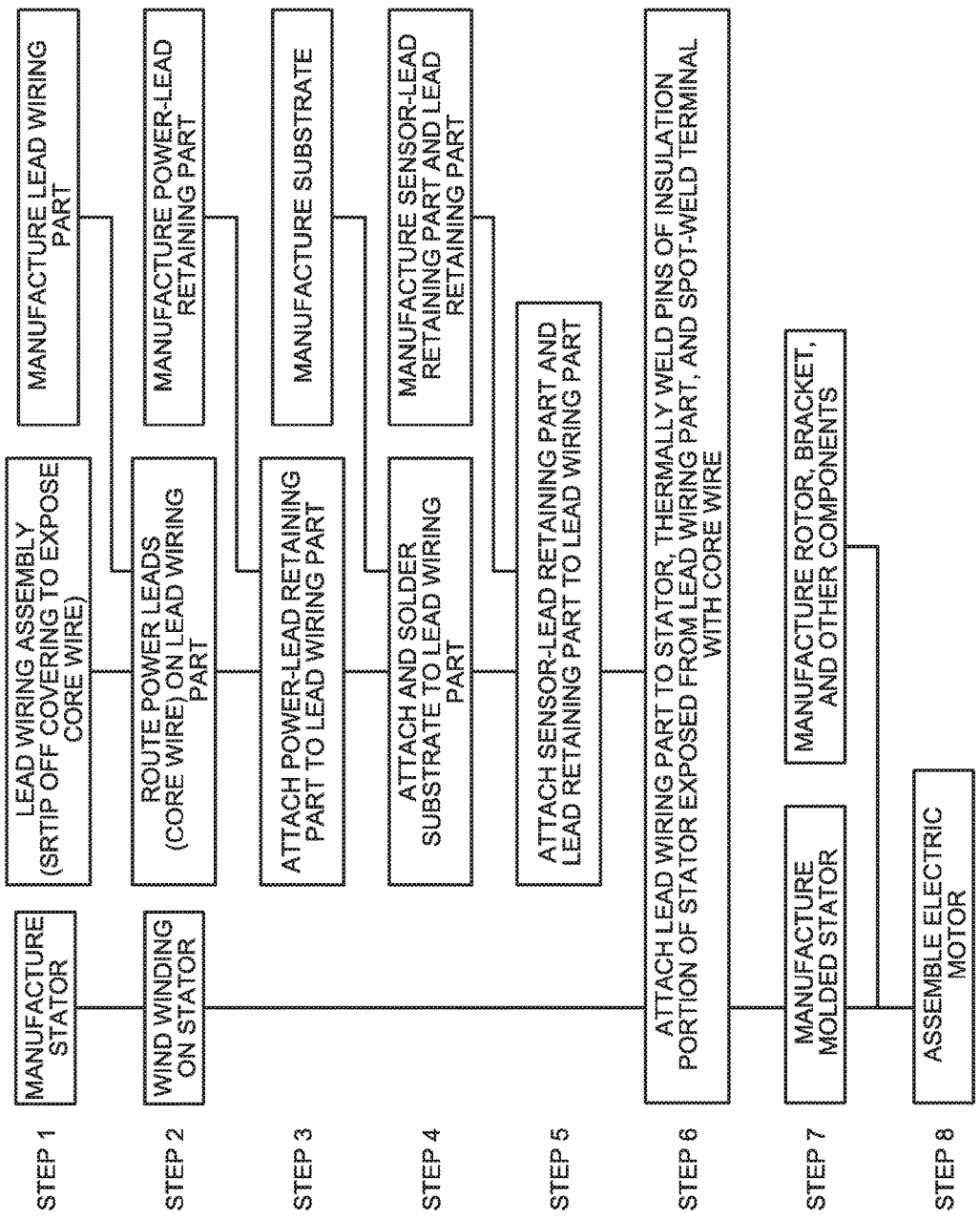
FIG. 21 is a diagram illustrating a manufacturing process of the molded electric motor.
Figure 22:
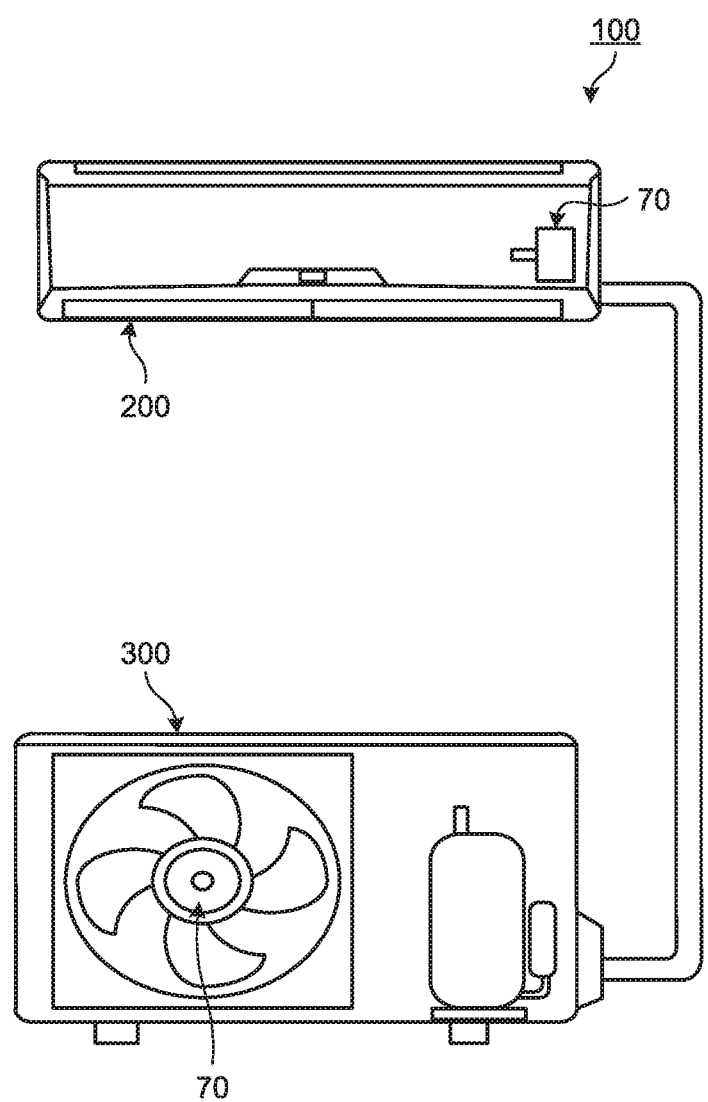
FIG. 22 is a configuration diagram of an air conditioner having the molded electric motor incorporated therein.

FIG. 1 is a perspective view of a stator assembly 30 for an electric motor according to an embodiment of the present invention. FIG. 2 is a perspective view of a lead wiring part 1 as viewed from one end face side. FIG. 3 is a perspective view of the lead wiring part 1 as viewed from the other end face side. FIG. 4 is an enlarged view of a lead retaining portion 9 as viewed from one end face side. FIG. 5 is a plan view of the lead retaining portion 9 illustrated in FIG. 4. FIG. 6 is an enlarged view of the lead retaining portion 9 as viewed from the other end face side. FIG. 7 is an enlarged view of a lead-end retaining portion 1f and a core-wire retaining portion 1m formed in the lead wiring part 1. FIG. 8 is a plan view of the lead wiring part 1 connected with a lead wiring assembly 40. FIG. 9 is an enlarged view of relevant parts in FIG. 8. FIG. 10 is a perspective view of the lead wiring part 1 to which a substrate 11 is attached. FIG. 11 is a perspective view of the substrate 11. FIG. 12 is a perspective view of a lead-out part 6 as viewed from the side of a sensor-lead facing surface 6j. FIG. 13 is a perspective view of the lead-out part 6 as viewed from the side of a power-lead facing surface 6k. FIG. 14 is a perspective view of a power-lead retaining part 4. FIG. 15 is a perspective view of a sensor-lead retaining part 5. FIG. 16 is a perspective view of a lead retaining part 3. FIG. 17 is a perspective view of the lead retaining part 3 as viewed from a sensor-lead facing surface 3b. FIG. 18 is a plan view of the lead retaining part 3 as viewed from the sensor-lead facing surface 3b. FIG. 19 is a perspective view of a molded stator 60. FIG. 20 is a perspective view of a molded electric motor 70. FIG. 21 is a diagram illustrating a manufacturing process of the molded electric motor 70. FIG. 22 is a configuration diagram of an air conditioner 100 having the molded electric motor 70 incorporated therein.

In FIG. 1, the stator assembly 30 is configured to include the lead wiring part 1, a lead lead-out part 2, the lead retaining part 3, a stator 10, the substrate 11, and the lead wiring assembly 40. The stator 10 is configured to include a stator core 82, an insulation portion 83, and windings 84.

The stator core 82 is obtained by stacking, realized by crimping, a plurality of electromagnetic steel plates that are stamped out into strips. The insulation portion 83 is obtained by molding PBT (polybutylene terephthalate), which is an example of thermoplastic resin, such that it is integral with the stator core 82 or by attaching the molded PBT to the stator 10. The insulating portion 83 includes a plurality of pins 81 and a plurality of terminals 12. The pins 81 project toward the lead wiring part 1 and are used for attaching the lead wiring part 1 to the stator 10. The terminals 12 are supplied with power from an external source. In the following descriptions, the side of the stator core 82 on which the terminals 12 are provided is referred to as a "connection side", and the side of the stator core 82 on which the terminals 12 are not provided is referred to as a "counter-connection side".

An insulation outer wall 83a constituting the insulation portion 83 prevents the windings 84 from falling toward the outer side of the stator core 82 in the radial direction. The pins 81 are provided at the axial end portion of the insulation outer wall 83a on the connection side. An insulation inner wall 83b constituting the insulation portion 83 prevents the windings 84 from falling toward the inner circumference side of the stator core 82. Projections (not illustrated) are provided at the axial end portion of the insulation inner wall 83b on the counter-connection side. When a resin is molded onto the stator assembly 30, the projections abut against a mold core metal portion in the axial direction.

The axial end portion of the insulation outer wall 83a is formed such that the height thereof becomes higher than the maximum axial height of the windings 84. Further, the windings 84 are formed such that the axial height thereof is reduced toward the insulation inner wall 83b from the insulation outer wall 83a. With this configuration, when the height of the projection (not illustrated) on the counter-connection side of the insulation inner wall 83b is set the same as the height of the axial end portion of the insulation outer wall 83a, a sufficient distance to the windings 84 can be provided. Therefore, when the stator 10 is placed on the mold core metal portion with the counter-connection side of the stator 10 facing downward, the stator 10 can be placed stably on the mold core metal portion without the windings 84 coming into contact with the mold core metal portion. This enables an improvement in productivity and quality.

The lead wiring assembly 40 is configured to include power leads 8 for supplying power to the windings 84, sensor leads 7, and a board-in connector 80 connected to the ends of the sensor leads 7. The ends of the sensor leads 7 indicate the ends inside of the mold when a resin is molded onto the stator assembly 30. The board-in connector 80 is connected to these ends.

As illustrated in FIG. 11, the substrate 11 has a rectangular shape obtained by chamfering diagonally opposite corners, and Hall ICs 13 that are position detection circuits for the rotor are mounted on the substrate 11. A plurality of terminal insertion holes 11d are also formed in the substrate 11. Each of the terminal insertion holes 11d is a hole for inserting a terminal 80a (see FIG. 10) provided in the board-in connector 80. The terminal insertion holes 11d are connected to a wiring pattern (not illustrated) on the substrate 11. Therefore, by bonding the terminals 80a to the terminal insertion holes 11d by soldering, the sensor leads 7 are electrically bonded to electronic components on the substrate 11.

A groove 11a and a notch 11b are formed on one of the longitudinal sides of the substrate 11. The groove 11a is used to lock an assembly leg 1i of the substrate retaining portion 1h illustrated in FIGS. 2 and 3. The notch 11b serves as a positioning member when the substrate 11 is attached to the substrate retaining portion 1h. On the other longitudinal side of the substrate 11, two notches 11c are formed to serve as positioning members when the substrate 11 is attached to the substrate retaining portion 1h.

An insulation portion is formed on a plurality of teeth (not illustrated) constituting the stator core 82. By winding magnet wires around the insulation portion, coils are formed. The ends of the magnet wires on one side led out from the coils wound around the teeth are routed to the hooks 85 of the terminals 12 and bonded thereto by fusing or soldering. The other ends of the magnet wires form a neutral point by collecting the ends of the U-phase, V-phase, and W-phase. The stator core 82 is obtained by bending a belt-like core in a specific direction and welding the abutting portions together.

The lead wiring part 1 in FIGS. 2 and 3 is configured to include a lead wiring portion 1a, the substrate retaining portion 1h, and the lead retaining portion 9.

The lead wiring portion 1a is formed in an annular shape by molding PBT, which is an example of thermoplastic resin. A plurality of attachment legs 1b, the lead-end retaining portions 1f, and the core-wire retaining portions 1m are formed radially outward from the lead wiring portion 1a. The substrate retaining portion 1h, an inner wall 1q, and a positioning portion 1p are formed radially inward from the lead wiring portion 1a.

In the example illustrated in FIGS. 2 and 3, four attachment legs 1b are formed. The attachment legs 1b are used for attaching the lead wiring part 1 to the stator 10. The attachment legs 1b each project toward the outer side of the lead wiring portion 1a and have a hole 1c for inserting the terminal 12 provided in the insulation portion 83.

When the lead wiring part 1 is attached to the stator 10, the attachment legs 1b come into contact with the installation surface (not illustrated) of the insulation portion 83 of the stator 10. Accordingly, the lead wiring part 1 is positioned in the axial direction. Further, because the pins 81 of the insulation portion 83 are inserted into the holes 1c of the attachment legs 1b, the lead wiring part 1 is positioned in the rotational direction.

In the example illustrated in FIGS. 2 and 3, three lead-end retaining portions 1f are formed to correspond to the three power leads 8. The core-wire retaining portion 1m in a pair with the lead-end retaining portion 1f is provided at a position away from the lead-end retaining portion 1f by a constant distance.

On the counter-stator side of the lead wiring portion 1a, a plurality of trapezoidal pedestals 1r are formed. Because the end faces of the pedestals 1r come into contact with the mold during molding, the stator assembly 30 can be axially positioned. The pedestals 1r have a trapezoidal shape; therefore, it is possible to reduce the area of the ends of the pedestals 1r exposed to the outside of the molded stator 60 in FIG. 19 and to increase the buckling strength of the pedestals 1r.

A pair of assembly legs 1i, a pair of grooves 1w, and a plurality of projections 1e are formed in the substrate retaining portion 1h. The assembly legs 1i are for attaching the substrate 11 to the lead wiring portion 1a. Claws 1x are formed at the tips of the assembly legs 1i. The notches 11c of the substrate 11 are respectively fitted into the grooves 1w. The projections 1e are members for retaining the substrate and project to the counter-stator side of the lead wiring portion 1a. The claws 1x formed at the tips of the assembly legs 1i are locked to the groove 11a and the notch 11b of the substrate 11.

Because the assembly legs 1i have a thin-wall structure, the molding pressure applied to the substrate 11 during molding can be dispersed. Further, because the projections 1e abut against the mold during molding, the substrate 11 can be positioned in the axial direction, thereby suppressing misalignment of the substrate 11 in the axial direction. Because the notches 11c of the substrate 11 are fitted into the grooves 1w of the substrate retaining portion 1h, movement or deformation of the substrate 11 due to the molding pressure can be suppressed. This enables an improvement in the quality of the electric motor. The substrate 11 can be attached to the lead wiring portion 1a while inserting the notches 11c of the substrate 11 into the grooves 1w of the substrate retaining portion 1h, and thus the substrate 11 can be easily attached to the lead wiring portion 1a. Even if the area of the substrate 11 is reduced, the substrate 11 can be easily attached to the lead wiring portion 1a; therefore, downsizing of the substrate 11 enables a cost reduction of the stator for an electric motor.

The inner wall 1q is used for routing the power leads 8 from the lead retaining portion 9 to the lead-end retaining portions 1f. A plurality of projections 1d projecting radially outward are formed on the inner wall 1q. The projections 1d are used for preventing axial displacement of the power leads 8 laid on the lead wiring portion 1a.

A plurality of recesses 1j are formed on the lead wiring portion 1a. The recesses 1j are used for providing spaces for the hooks 85 (see FIG. 1), which are electrodes that sandwich the terminals 12 of the stator 10 and core wires 8a (see FIG. 10) of the power leads 8.

As illustrated in FIG. 4 to FIG. 6, the lead retaining portion 9 is configured to include three fold-back pins 9g and a base 9a that retains the sensor leads 7 and the power leads 8. The two lead fold-back pins 9g at both ends among the three lead fold-back pins 9g are located such that the stator side surface thereof is located on the stator side relative to the stator side surface of the lead wiring portion 1a. Due to this configuration, axial displacement of the power leads can be prevented near the lead lead-out portion. This enables an improvement in quality.

Two projections 9c for preventing displacement of the leads are formed on a power-lead facing surface 9b of the base 9a. On a sensor-lead facing surface 9d of the base 9a, five grooves 9e for retaining the sensor leads 7 are formed. Two insertion ports 9f are formed in the sensor-lead facing surface 9d of the base 9a.

The insertion ports 9f are formed on both sides in the rotational direction of the sensor-lead facing surface 9d, and are located at the radial center of the sensor-lead facing surface 9d. Claws 3d of the lead retaining part 3 illustrated in FIG. 16 to FIG. 18 are inserted into the insertion ports 9f. By inserting the claws 3d into the insertion ports 9f to lock the claws 3d, the sensor leads 7 are firmly retained between the lead wiring part 1 and the lead retaining part 3. By retaining the sensor leads 7, misalignment of the sensor leads 7 in the rotational direction can be suppressed, and misalignment of the sensor leads 7 in the axial direction can be also suppressed. This enables a further improvement in quality.

Two claws 3d and five grooves 3c for retaining the sensor leads are formed on the sensor-lead facing surface 3b of the base 3a, which comes into contact with the leads. The claws 3d are formed on both sides in a rotational direction B of the sensor-lead facing surface 3b and are located at the center in a radial direction A on the sensor-lead facing surface 3b. In this manner, the lead retaining part 3 has a line-symmetric shape with respect to a centerline a in a lateral direction or to a centerline b in a longitudinal direction of the sensor-lead facing surface 3b. Due to this configuration, the lead retaining part 3 is attached to the lead retaining portion 9 without concerning the orientation of the lead retaining portion 9, thereby enabling the manufacturing process to be simplified.

The lead lead-out part 2 illustrated in FIG. 8 and FIG. 9 is provided at a position away from the lead retaining part 3 by a constant distance. By separating the lead lead-out part 2 from the lead wiring part 3 by a constant distance, the lead lead-out part 2 and the lead retaining portion 9 are separated from each other. Therefore, even if water enters from a boundary surface between the lead lead-out part 2 and a mold resin while the motor is in use, an entry path of water is not formed between the lead lead-out part 2 and the lead retaining portion 9. Accordingly, the entry path of water is blocked. This can prevent water from reaching the substrate 11 and improve resistance against water exposure.

Furthermore, because the lead lead-out part 2 is provided at a position away from the lead retaining part 3 by a constant distance, even if the stator assembly 30 is installed deviated in the rotational direction with respect to a mold in a process of placing the stator assembly 30 on the mold, the distance between the lead wiring part 1 and the lead lead-out part 2 can be ensured. Accordingly, the lead wiring part 1 and the lead lead-out part 2 can be prevented from coming into contact with each other. This enables an improvement in quality.

The positioning portion 1p includes a base 1t formed radially inward from the inner wall 1q of the lead wiring portion 1a, an insertion hole 1s formed in the base 1t, and a projection 1n formed on the base 1t. The insertion hole 1s is used for positioning the stator assembly 30 in the rotational direction and is located on the inner side of the inner-diameter side surface of the stator 10. Specifically, the insertion hole 1s is formed at a position corresponding to a pin or a projection projecting from the center shaft that is used for positioning the mold in the radial direction. By inserting the pin or the projection projecting from the center shaft into the insertion hole 1s, the stator assembly 30 is positioned in the rotational direction, and the lead lead-out part 2 to be fixed to the mold and the leads connected to the stator assembly 30 are positioned on the same straight line. The lead lead-out part 2 and the leads connected to the stator assembly 30 are positioned on the same straight line. Thus, the stator 10 is prevented from being displaced in the rotational direction when it is set in a mold or the stator 10 is prevented from being angularly offset from the lead lead-out part 2. Therefore, the leads connected to the stator assembly 30 are prevented from being stretched and thus a load can be prevented from being applied to the soldered portion of the substrate 11. Furthermore, when the rotational force is applied to the stator 10 due to the resin pressure during molding, the positioning portion 1p functions to prevent the stator 10 from rotating.

As in the illustrated example, the base 1t is formed in a thin-wall shape coupled to the inner wall 1q of the lead wiring portion 1a at two places. Thus, the positioning portion 1p can be prevented from being deformed due to the resin pressure during molding or can be prevented from being exposed to the inner-diameter portion side of the molded stator 60 due to the resin pressure during molding. This enables an improvement in the quality of the stator 10.

The projection 1n is formed on the stator side surface of the base 1t and formed at a fixed height so as to come into contact with an axial end face of the center shaft that is used for positioning the mold in the radial direction. With the provision of the projection 1n, the stator assembly 30 is axially positioned by bringing the projection 1n into contact with the center shaft during molding. Thus, the positioning portion 1p can be prevented from being exposed to the inner-diameter portion side of the molded stator 60 due to the resin pressure during molding. This enables an improvement in quality of the stator 10.

The positioning portion 1p is formed at a position facing the lead retaining portion 9 at an angle of 180 degrees on the inner wall 1q of the lead wiring portion 1a. In such a configuration, for example, a molded electric motor 70 (see FIG. 20) using the stator assembly 30 according to the present embodiment is installed in an outdoor unit 300 (see FIG. 22) such that the shaft 72 of the molded electric motor 70 is horizontal, and in such a positional relation that the lead retaining portion 9 is on the lower side and the positioning portion 1p is on the upper side. Accordingly, even if water enters from the lead lead-out part 2, water can be prevented from reaching the substrate 11. This enables an improvement in quality of the stator 10.

The lead-out part 6 illustrated in FIGS. 12 and 13 includes a rectangular plate-like base 6e, a pair of locks 6a locked to locking legs 5b of the sensor-lead retaining part 5, and a pair of locks 6b locked to projections 4f of the power-lead retaining part 4.

A plurality of grooves 6f and a plurality of retaining projections 6h for retaining the sensor leads 7 are formed on the sensor-lead facing surface 6j of the base 6e. A plurality of grooves 6g for retaining the power leads 8 are formed on the power-lead facing surface 6k of the base 6e.

The locks 6a are bent radially outward from the side surfaces of the base 6e, and the tip portions thereof are formed in a hook shape. An opening 6d that opens radially outward is formed between the tip portion of each of the locks 6a and the base 6e. Locking legs 5b of the sensor-lead retaining part 5 (see FIG. 15) are inserted into the openings 6d. Accordingly, the locking legs 5b are locked to the end portions of the locks 6a to retain the sensor-lead retaining part 5.

The locks 6b are bent radially inward from the side surfaces of the base 6e, and the tip portions thereof are formed in a hook shape. An opening 6c that opens radially inward is formed between the tip portion of each of the locks 6b and the base 6e. Locking legs 4b of the power-lead retaining part 4 (see FIG. 14) are inserted into the openings 6c. Accordingly, the locking legs 4b are locked to the end portions of the locks 6b to retain the power-lead retaining part 4.

The power-lead retaining part 4 illustrated in FIG. 14 includes a base 4g coming into contact with the power leads 8, grooves 4a formed on a power-lead facing surface 4d of the base 4g to accommodate the power leads 8, a pair of locking legs 4b extending in a vertical direction from the surface of the base 4g on which the grooves 4a are formed, a pair of ribs 4c extending radially inward from the base 4g, and a coupling portion 4e that couples the ribs 4c. The projections 4f are provided at the end portions of the locking legs 4b.

After the power leads 8 are laid on the lead wiring part 1, by locking the locking legs 4b to the locks 6b of the lead-out part 6 (see FIGS. 12 and 13), the power-lead retaining part 4 is attached to the lead-out part 6. When the power-lead retaining part 4 is locked to the lead-out part 6, the ribs 4c of the power-lead retaining part 4 come into contact with the lead-out part 6, thereby fixing the power leads 8 to the lead lead-out part 2. Accordingly, the power leads 8 can be prevented from being displaced due to the pressure of a mold resin during molding.

The sensor-lead retaining part 5 illustrated in FIG. 15 includes a base 5d coming into contact with the sensor leads 7, grooves 5a formed on a sensor-lead facing surface 5c of the base 5d to accommodate the sensor leads 7, and a pair of locking legs 5b. The locking legs 5b are formed in an L-shape such that they extend from the side surfaces of the base 5d in the vertical direction and are bent toward the inner side in the radial direction. The locking legs 5b are inserted into the openings 6d of the lead-out part 6 illustrated in FIGS. 12 and 13 and locked to the end portions of the locks 6a.

Wiring of the sensor leads 7 and the power leads 8 is described next. The power leads 8 for three phases are respectively routed to the terminals 12 of the stator 10 that are arranged at intervals of 120 degrees. The ends of the power leads 8 are stripped of their covering and are brought into contact with the inner side (not illustrated) of the walls 1g of the lead-end retaining portions 1f so as to be positioned. (see FIG. 10). The core wires 8a of the power leads 8 led out from the lead-end retaining portions 1f are routed to the core-wire retaining portions 1m. When the lead wiring part 1 is attached to the stator 10, the core wires 8a are retained such that they are into contact with the terminals 12 of the stator 10, and the core wires 8a and the terminals 12 are spot welded.

When the lead wiring part 1 is attached to the stator 10, the power leads 8 are routed to the lead retaining portion 9 along the outer side of the inner wall 1q in the radial direction. Because the recesses 1j are formed on the lead wiring portion 1a, the power leads 8 are routed on the stator side beyond the flat surface of the lead wiring portion 1a on the stator side. At this point in time, the power leads 8 are positioned in the axial direction by the projections 1d on the inner wall 1q. The power leads 8 routed to the lead retaining portion 9 are bent in the direction of the power-lead facing surface 9b by the fold-back pins 9g of the lead retaining portion 9 and fitted into the projections 9c.

One of the power leads 8 routed between the two projections 9c of the lead retaining portion 9 is routed in a counter-clockwise direction up to the lead-end retaining portion 1f and the core-wire retaining portion 1m that are located at a position furthest from the lead retaining portion 9 among three pairs of the lead-end retaining portion 1f and the core-wire retaining portion 1m, that is, at a position rotated around the lead wiring portion 1a by 180 degrees from the position of the substrate retaining portion 1h. Among the remaining two power leads 8, one of the power leads 8 is routed to the lead-end retaining portion 1f and the core-wire retaining portion 1m provided closest to the lead retaining portion 9. The other power lead 8 is routed around the outer side in the radial direction of the power lead 8 routed to the furthest position.

The board-in connector 80 is soldered to the substrate 11 attached to the substrate retaining portion 1h. The sensor leads 7 connected to the board-in connector 80 are routed in a direction of the lead retaining portion 9, and disposed in the grooves 9e of the lead retaining portion 9. After the sensor leads 7 are disposed in the lead retaining portion 9, the claws 3d of the lead retaining part 3 are inserted into the insertion ports 9f of the lead retaining portion 9. Accordingly, the sensor leads 7 are firmly retained between the lead retaining portion 9 and the lead retaining part 3 and displacement of the sensor leads 7 can be suppressed. This enables a further improvement in quality.

Assembling of the lead wiring assembly 40 is performed by using a jig. First, the lead wiring part 1 and the power-lead retaining part 4 on which the power leads 8 are routed are installed in the jig, and the power leads 8 are placed on the lead retaining portion 9. The lead-out part 6 is installed on the power leads 8 led out from the lead retaining portion 9, and the sensor leads 7 led out from the lead retaining portion 9 are placed on the lead-out part 6. The sensor-lead retaining part 5 is installed on the sensor leads 7, and the power-lead retaining part 4 and the sensor-lead retaining part 5 are attached to the lead-out part 6 by using the jig. Specifically, the sensor-lead retaining part 5 is attached by sliding it from the outer side of the lead wiring part 1 in the radial direction toward the center of the lead wiring part 1. The power-lead retaining part 4 is attached by sliding it from the center of the lead wiring part 1 toward the outer side of the lead wiring part 1 in the radial direction. By assembling the lead wiring assembly 40 by using a jig, the lead lead-out part 2 can be positioned relative to the lead wiring part 1. This enables an improvement in quality. Further, the power-lead retaining part 4, the sensor-lead retaining part 5, and the lead-out part 6 can be attached simultaneously in one process, thereby enabling the operation process to be simplified.

The lead wiring part 1 on which the sensor leads 7 and the power leads 8 are laid is attached to the stator 10. At this point in time, the pins 81 of the stator 10 are exposed through the holes 1c of the attachment legs 1b. The pins 81 are thermally or ultrasonically welded so as to secure the lead wiring part 1 to the stator 10. Thereafter, the core wires 8a and the terminals 12 are spot welded to electrically connect the power leads 8 to the terminals 12, thereby acquiring the stator assembly 30.

As described above, the power leads 8 are routed on the stator side surface of the lead wiring portion 1a, and the sensor leads 7 are routed on the counter-stator side surface of the lead wiring portion 1a. Accordingly, a work for attaching the leads to the lead wiring part 1 is simplified. This enables an improvement in quality and a reduction in cost.

A BMC (Bulk Molding Compound), which is an example of thermosetting resin, is molded onto the stator assembly 30 assembled in this manner. Accordingly, the molded stator 60 illustrated in FIG. 19 is acquired. A rotor (not illustrated) and a bracket 74 illustrated in FIG. 20 are incorporated in an opening 62 of the molded stator 60. At the time of molding a resin onto the stator assembly 30, the lead lead-out part 2 is pushed outward in the radial direction from the center of the stator 10 due to the molding pressure. Therefore, the lead lead-out part 2 can maintain its position without coming into contact with the stator core 82. Moreover, the leads are not fixed such that they are in contact with the stator core 82, and an air gap is not formed at a portion formed when the leads come into contact with the stator core 82. Therefore, water entering from a gap or interface between the lead lead-out part 2 and the mold resin does not pass through an air gap at each lead to reach the substrate 11. This enables an improvement in quality of the stator 10.

When the stator 10 is placed on the mold, the projection (not illustrated) formed on the counter-connection side of the insulation inner wall 83b is supported by a placement portion formed on the mold. The placement portion is, for example, a stepped portion having an outer diameter larger than the inner diameter of the stator core 82, a plurality of claws extending in a projecting manner from a placement surface in the opening portion of the core metal portion of the mold toward the stator 10 side, or a plurality of projections extending from a bracket placement surface near the mold core metal portion in a manner such that the projections do not connect with the inner diameter of the stator core 82.

In this manner, because the stator 10 is supported by the placement portion of the mold, it is not necessary for the mold that is a restraining member to support the outer periphery of the stator 10 during molding. Therefore, no boundary surface between the stator core 82 and the mold resin is formed on the contour of the molded stator 60.

Furthermore, when the stator 10 is to be supported by the projections on the mold, even if the molded stator 60 is placed on the mold, the projection (not illustrated) formed on the counter-connection side of the insulation inner wall 83b is not exposed to the inner diameter side of the stator core 82. This can further enhance the effect of inhibiting the entry of water.

In FIG. 20, the shaft 72, a watertight cap 71, and an E ring 73 of the rotor are attached to the molded stator 60 by using the bracket 74. The watertight cap 71 is for preventing entry of water from a gap between the shaft 72 and the bracket 74. Accordingly, it is possible to obtain the molded electric motor 70 that allows an increase in productivity and a resulting improvement in quality and that allows a reduction in cost.

Next, the manufacturing process of the molded electric motor 70 is described with reference to FIG. 21.

(1) Step 1: The stator 10 is manufactured. Simultaneously, the lead wiring assembly 40 and the lead wiring part 1 are manufactured.

(2) Step 2: The windings 84 are wound on the stator 10. Simultaneously, the power leads 8 are laid on the lead wiring part 1. At this point in time, the core wires 8a of the power leads 8 are routed to the core-wire retaining portions 1m. Simultaneously, the power-lead retaining part 4 is manufactured.

(3) Step 3: The power-lead retaining part 4 is attached to the lead wiring part 1. Simultaneously, the substrate 11 is manufactured.

(4) Step 4: The substrate 11 is attached to the lead wiring part 1. The terminals of the board-in connector 80 are soldered to the substrate 11 attached to the substrate retaining portion 1h. Simultaneously, the sensor-lead retaining part 5 and the lead retaining part 3 are manufactured.

(5) Step 5: The sensor-lead retaining part 5 and the lead retaining part 3 are attached to the lead wiring part 1.

(6) Step 6: The lead wiring part 1 is attached to the stator 10, the pins 81 projecting from the attachment legs 1b of the lead wiring part 1 are thermally welded, and the terminals 12 of the stator 10 and the core wires 8a are spot welded.

(7) Step 7: A resin is molded onto the stator assembly 30 so as to manufacture the molded stator 60. Simultaneously, the rotor and the bracket 74 are manufactured.

(8) Step 8: The molded electric motor 70 is manufactured by attaching the rotor and the like to the molded stator 60.

FIG. 22 illustrates an air conditioner 100 having the molded electric motor 70 according to the embodiment of the present invention incorporated therein. The air conditioner 100 includes an indoor unit 200 and an outdoor unit 300 connected to the indoor unit 200. The molded electric motor 70, which is a driving source for a fan, is provided in the indoor unit 200 and the outdoor unit 300. When the molded electric motor 70 is to be installed in the indoor unit 200 and the outdoor unit 300, a plurality of attachment legs 61 (see FIG. 19) extending radially outward from the outer circumferential side of the molded stator 60 are used. Such the molded electric motor 70 is used as an electric motor for a fan, which is a main part of the air conditioner 100; therefore, water can be prevented from entering the stator of the electric motor for a fan. Therefore, it is possible to obtain the air conditioner 100 that is low in cost and is of good quality.

The shape of the lead retaining portion 9 is not limited to the one illustrated in the drawings, and any shape can be used as long as the lead retaining portion 9 is integrally formed with the lead wiring portion 1a and has a shape that can fix the sensor leads 7 and the power leads 8 to the lead wiring portion 1a. Also, in the present embodiment, the lead retaining part 3 is fixed to the lead wiring part 1 by locking the two claws inserted into the two insertion ports 9f. However, any shape can be used as long as the configuration is such that the lead retaining part 3 is attached to the lead wiring part 1 with a single operation. For example, such a configuration can be used that one of the end faces of the lead retaining part 3 is fixed to the lead wiring portion 1a and a claw formed on the other end face of the lead retaining part 3 is inserted into the insertion hole of the lead wiring portion 1a and locked.

As described above, according to the molded stator 60 that is the stator for an electric motor according to the present embodiment, the substrate 11 is retained only by the lead wiring part 1, and the sensor leads 7 and the power leads 8 being the leads are retained by the lead wiring part 1. In the conventional technique illustrated in Patent Literature 1 described above, when the lead lead-out part is separated from the lead wiring part, the leads are retained only by the lead lead-out part. Therefore, if the leads are subjected to a load in a manufacturing process, there is a problem in that stress is applied to the soldered portion of the substrate connected to the ends of the leads, and the electric motor may become inoperable. In contrast, in the stator for an electric motor according to the present embodiment, the leads are retained by the lead wiring part 1. Therefore, even if the leads connected to the stator assembly 30 are pulled, it can be suppressed that a load is applied to the soldered portion of the substrate 11. As a result, the quality can be further improved as compared to the conventional technique. Further, because generation of stress in the soldered portion of the substrate 11 can be suppressed, it is not necessary to retain the lead lead-out part 2 that collects the leads, thereby enabling simplification of the manufacturing process, simplification of the component shape of the lead wiring part 1, and a reduction in the material cost. Further, because the sensor leads 7 being some of the leads are retained by the lead retaining portion 9, movement of the sensor leads 7 due to the resin pressure during molding, particularly, movement thereof in the rotational direction can be prevented. This enables an improvement in quality.

The stator for an electric motor according to the present embodiment includes the lead retaining part 3 attached to the lead wiring part 1 to retain the leads. By attaching the lead retaining part 3 to the lead wiring part 1, it can be suppressed that the leads move in the rotational direction and the axial direction in the manufacturing process. Thus, it is possible to prevent generation of stress to the soldered portion of the substrate and to improve the quality.

The stator for an electric motor according to the present embodiment includes the lead lead-out part 2 that leads out the leads retained by the lead wiring part 1. Accordingly, displacement of the power leads 8 caused by the pressure of the mold resin during molding can be suppressed.

The lead lead-out part 2 is disposed away from the lead retaining part 3 by a constant distance. Accordingly, an entry path of water between the lead lead-out part 2 and the lead retaining part 3 is blocked, thereby enabling resistance against water exposure to be improved.

The molded electric motor 70 that is the electric motor according to the present embodiment uses the molded stator 60. Therefore, the quality thereof can be improved. Further, the air conditioner 100 according to the present embodiment includes the molded electric motor 70 incorporated in a fan. Therefore, the quality thereof can be improved.

INDUSTRIAL APPLICABILITY

As described above, the present invention is useful in a stator for an electric motor that drives a load, an electric motor, and an air conditioner.

The invention claimed is:

1. A stator for an electric motor comprising:
   a substrate;
   a plurality of leads connected to the substrate;
   a lead wiring part retaining the substrate and routing the leads;
   a lead retaining portion formed as a part of the lead wiring part and retaining the leads;
   a lead retaining part formed separately from the lead wiring part and attached to the lead retaining portion and firmly retaining the leads between the lead retaining portion and the lead retaining part; and
   a lead lead-out part leading out the leads while being retained by the lead retaining portion and the lead retaining part, the lead lead-out part being disposed at a position separated from the lead retaining part by a constant distance in a direction away from the lead wiring part, wherein
   the lead retaining portion has a first surface that is in contact with the leads, two insertion ports and first grooves that are formed in the first surface with the first grooves disposed between the insertion ports, the lead retaining part has a second surface that is in contact with the leads, and two claws and second grooves formed on the second surface with the second grooves disposed between the claws, and the claws are inserted in the insertion holes to interlock the lead retaining part and the lead retaining portion while each of the leads is retained between a respective one of the first grooves and a corresponding one of the second grooves.

2. The stator for an electric motor according to claim 1, wherein the lead retaining part has a line-symmetric shape with respect to a centerline in a longitudinal direction of a surface that is in contact with the leads.

3. The stator for an electric motor according to claim 1, wherein the lead retaining part has a line-symmetric shape with respect to a centerline in a lateral direction of a surface that is in contact with the leads.

4. The stator for an electric motor according to claim 1, further comprising a stator core, wherein the lead lead-out part is disposed away from an axial end face of the stator core in an axial direction.

5. An electric motor using the stator for an electric motor according to claim 1.

6. An air conditioner having the electric motor according to claim 5 incorporated in a fan.

7. The stator for an electric motor according to claim 2, further comprising a stator core, wherein the lead lead-out part is disposed away from an axial end face of the stator core in an axial direction.

8. The stator for an electric motor according to claim 3, further comprising a stator core, wherein the lead lead-out part is disposed away from an axial end face of the stator core in an axial direction.

9. The stator for an electric motor according to claim 1, wherein the lead retaining portion is integrally formed with the lead wiring part.

\* \* \* \* \*